Dec. 8, 1931.  A. D. ROBBINS  1,835,525
BEARING SUPPORT FOR DRIVING AXLES
Original Filed April 26, 1930  2 Sheets-Sheet 1

INVENTOR
Azor D. Robbins
BY
HIS ATTORNEYS

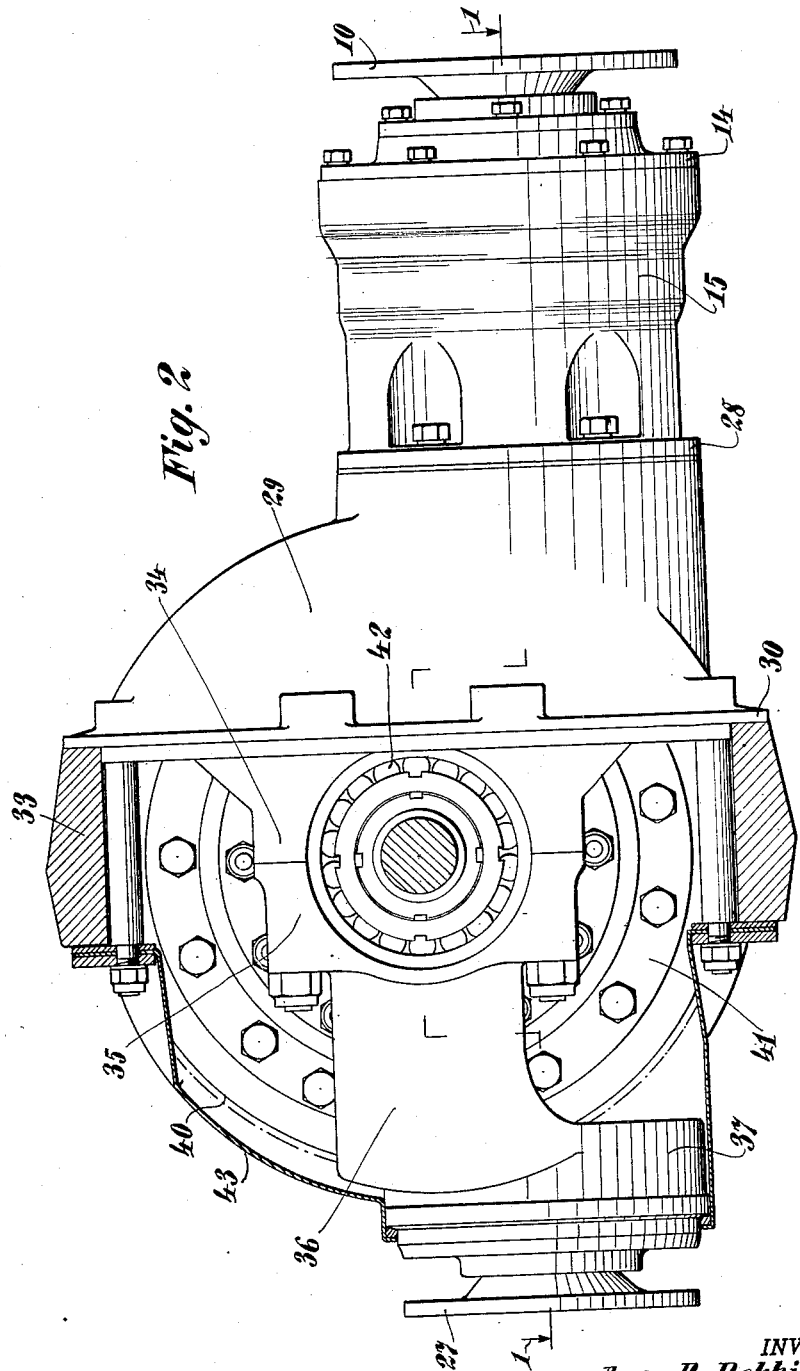

Patented Dec. 8, 1931

1,835,525

UNITED STATES PATENT OFFICE

AZOR D. ROBBINS, OF NEW BRUNSWICK, NEW JERSEY, ASSIGNOR TO INTERNATIONAL MOTOR COMPANY, OF NEW YORK, N. Y., A CORPORATION OF DELAWARE

BEARING SUPPORT FOR DRIVING AXLES

Original application filed April 26, 1930, Serial No. 447,463. Divided and this application filed August 23, 1930. Serial No. 477,253.

The present invention relates to driving mechanisms for motor vehicles, and embodies, more specifically, an improved bearing support for the driving shafts of a motor vehicle employing a plurality of driving axles.

More particularly, the invention relates to bearing supports for motor vehicles of the so-called duel drive type, it being particularly well adapted to those types employing a third differential for dividing power between a plurality of driving axles, the third differential being mounted forwardly of the axle.

In driving mechanisms of the above character, difficulty has heretofore been encountered in assembling the units in such a manner as to provide adequate strength as well as an accessible and readily serviced unit. With the foregoing in view, it is an object of the present invention to provide a drive of the above character wherein the carrier assembly of an axle is a self-contained unit. This is of material advantage over the old system of mounting the outboard pinions in covers attached to the rear of the banjo, thus sacrificing proper alignment, etc.

A further object of the invention is to provide a bearing support which is formed upon the axle banjo in such a manner as to mount, accurately, the bearings for the through shafts and further provide a bearing support for the differential bearings.

A further object of the invention is to provide a construction of the above character which is a complete unit including a differential gear, a hypoid gear, and through shaft, such unit being completely assembled before being inserted into the banjo.

Further objects, not specifically enumerated above, will be apparent as the invention is described in greater detail in connection with the accompanying drawings, wherein:

Figure 2 is a view in section taken on line 2—2 of Figure 1 and looking in the direction of the arrows.

Figure 1:
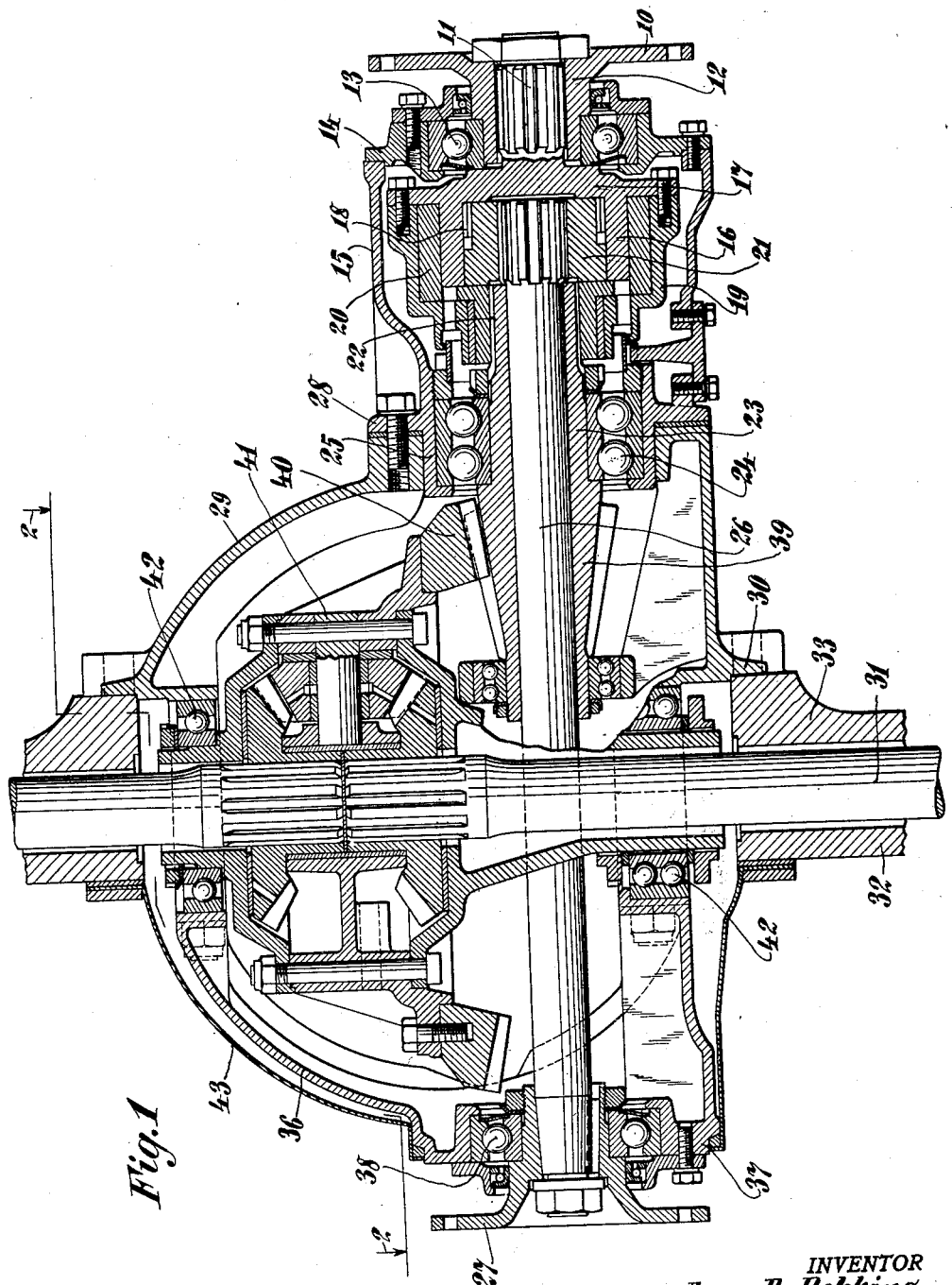
Figure 1 is a view in longitudinal section taken on line 1—1 of Figure 2 and looking in the direction of the arrows.

Referring to the above drawings, driving flange 10 is connected to a power source through the universal joint in any well known fashion, and drives the splined stub shaft 11 through its hub 12. The hub 12 is journalled at 13 in a cover plate 14 secured to a third differential housing 15.

Within the housing 15, a cylindrical spider 16 is mounted. This spider is formed on a disc 17 which is secured to the splined stub shaft 11 and carries a series of wedges 18 of suitable form with radial apertures within the cylindrical spider. The cover 19 is secured to the spider and serves as a means for preventing the escape of lubricant from the differential mechanism. The type of differential mechanism contemplated herein is as described in the co-pending application of Azor D. Robbins, Serial No. 447,463, filed April 26, 1930, and the present application is a divisional application thereof.

The external cylindrical driven member 20 is formed with cam tracks against which the wedges 18 engage, cooperating in this fashion with similarly formed tracks upon the internal driven member 21. The driven member 20 is splined at 22 to a pinion shaft 23, which is journalled at 24 within the extension 25 of the housing 15. The internal driven member 21 is splined to the through shaft 26 which drives the flanged member 27 to carry the drive rearwardly to a second driven axle.

Secured to the radial flange 28 on the housing 15 is a cage 29, formed with a flange 30. This cage forms the forward housing portion of the final drive for the jackshafts 31, these jackshafts being carried by axle 32. A banjo 33 is formed on the axle 32. Against this banjo the flange 30 is secured, as clearly shown in Figure 1.

Cage 29 is formed with bosses 34, to which bosses 35 are secured. Bosses 35 are formed integral with the rearwardly extending arms 36, a bearing supporting member 37 being formed on the arms 36. Within the bearing supporting member 37, a bearing 38 is received, this bearing being journalled to the rearward extremity of the through shaft 26.

The pinion shaft 23 is formed with a pinion 39 which drives the ring gear 40 of the differential mechanism 41, these elements being of standard form. The differential mechanism is journalled at 42 in the bosses 34 and 35, and thus enables the entire unit to be assembled upon the cage 29 prior to mounting the same upon the banjo. In mounting the unit upon the banjo, a thin sheet metal cover 43 is secured over the arms 36 to complete the closure for the mechanism.

From the foregoing, it will be seen that a construction has been provided by means of which the driving elements of an axle may be assembled as a unit before being mounted upon the axle. It will be further noted that the cage and bearing supporting means, described above, is particularly well suited for use in connection with the third differential for apportioning power between a plurality of driving axles.

While the invention has been described with specific reference to the accompanying drawings, it is not to be limited, save as defined in the appended claims.

I claim as my invention:

1. A mounting of the character described comprising a cage forming housing for a differential, means carried by the cage for journalling a power shaft, an arm on the cage, and a bearing on the arm aligned with the journalling means, and a housing mounted over a portion of the cage and cooperating with a portion thereof to form a closure for the differential.

2. A mounting of the character described comprising a cage, rearwardly extending arms on the cage, bearings on the arms for journalling a differential mechanism, a bearing on the cage for a power shaft and a bearing on the arms aligned with the last named bearing for a power shaft, and a cover for the arms.

3. A mounting of the character described comprising a cage, rearwardly extending arms on the cage, bearings on the arms for journalling a differential mechanism, a bearing on the cage, a bearing on the arms aligned with the last named bearing, a cover for the arms, and a flange on the cage adapted to be secured to the banjo portion of an axle.

4. A mounting of the character described comprising a cage, rearwardly extending arms on the cage, bearings on the arms for journalling a differential mechanism, a differential housing mounted on the cage forwardly thereof, a bearing in the housing, a bearing on the arms aligned with the last named bearing, a cover for the arms, and a flange on the cage adapted to be secured to the banjo portion of an axle.

This specification signed this 18th day of August, A. D. 1930.

AZOR D. ROBBINS.